(12) United States Patent
Long

(10) Patent No.: US 8,243,844 B2
(45) Date of Patent: Aug. 14, 2012

(54) POWER REDUCTION FOR DIGITAL SUBSCRIBER LINE

(75) Inventor: Guozhu Long, Fremont, CA (US)

(73) Assignee: Futurewei Technologies, Inc., Plano, TX (US)

( * ) Notice: Subject to any disclaimer, the term of this patent is extended or adjusted under 35 U.S.C. 154(b) by 853 days.

(21) Appl. No.: 12/276,564

(22) Filed: Nov. 24, 2008

(65) Prior Publication Data

US 2009/0141823 A1 Jun. 4, 2009

Related U.S. Application Data

(60) Provisional application No. 60/991,498, filed on Nov. 30, 2007, provisional application No. 61/020,993, filed on Jan. 14, 2008.

(51) Int. Cl.
H04L 27/00 (2006.01)
(52) U.S. Cl. ......... 375/295; 375/259; 375/260; 370/525
(58) Field of Classification Search .......... 375/295–297, 375/259–260, 285; 370/235, 254, 480, 525
See application file for complete search history.

(56) References Cited

U.S. PATENT DOCUMENTS

| | | | | |
|---|---|---|---|---|
| 6,647,117 B1 * | 11/2003 | Wallace et al. | ............... | 379/413 |
| 6,674,810 B1 | 1/2004 | Cheng | | |
| 6,885,699 B2 * | 4/2005 | Verbin | .......... | 375/222 |
| 7,254,180 B1 * | 8/2007 | Oelcer | ........... | 375/261 |
| 7,292,639 B1 * | 11/2007 | Demirekler et al. | .......... | 375/260 |
| 7,403,569 B2 * | 7/2008 | Redfern | ......... | 375/260 |
| 7,486,608 B1 * | 2/2009 | Long et al. | ..................... | 370/207 |
| 2004/0022308 A1 * | 2/2004 | Altekar et al. | ................ | 375/222 |
| 2005/0100108 A1 | 5/2005 | Yun et al. | | |
| 2007/0071120 A1 * | 3/2007 | Talwar | ........................ | 375/260 |
| 2007/0140101 A1 * | 6/2007 | Guo et al. | .................... | 370/204 |
| 2007/0291635 A1 * | 12/2007 | Yang et al. | .................... | 370/208 |
| 2008/0159422 A1 * | 7/2008 | Chen et al. | .................... | 375/260 |
| 2008/0273604 A1 | 11/2008 | Shi | | |
| 2008/0310484 A1 * | 12/2008 | Shattil | .......... | 375/146 |
| 2010/0296604 A1 * | 11/2010 | Tzannes et al. | ............... | 375/295 |

FOREIGN PATENT DOCUMENTS

CN 1849761 A 10/2006

(Continued)

OTHER PUBLICATIONS

Foreign Communication From a Related Counterpart Application—International Search Report and Written Opinion, PCT/CN2008/073238, Mar. 5, 2009, 9 pages.

(Continued)

*Primary Examiner* — Jean B Corrielus
(74) *Attorney, Agent, or Firm* — Conley Rose, P.C.; Grant Rodolph; Clint Wilkins

(57) ABSTRACT

An apparatus comprising a transmitter configured to transmit a low power mode Discrete Multi-Tone (DMT) signal using a plurality of DMT tones, wherein a subset of the DMT tones are used for transmitting data, and wherein at least some of the remaining DMT tones are used for a Peak-to-Average Ratio (PAR) reduction is disclosed. Included is a network component comprising at least one processor configured to implement a method comprising promoting transmission of a plurality of data streams using a plurality of first digital tones, and promoting transmission of at least one second digital tone that reduces a peak of a signal generated by at least one of the first digital tones.

19 Claims, 3 Drawing Sheets

FOREIGN PATENT DOCUMENTS

CN    1933523 A    3/2007

OTHER PUBLICATIONS

International Telecommunication Union, "A Proposal for a Stable Low Power Mode," Telecommunication Standardization Sector of ITU, Study Group 15, Question 4, Bordeaux, France, Dec. 3-7, 2007, 2 pages.

International Telecommunication Union, "PAR Reduction in Multicarrier Transmission Systems," Telecommunication Standardization Sector of ITU, Study Group 15, Question 4, Geneva, Switzerland, Feb. 9-20, 1998, 14 pages.

International Telecommunication Union, "Complexity of Various PAR Reduction Techniques for G.dmt and G.lite," Telecommunication Standardization Sector of ITU, Study Group 15, Question 4, Chicago, Illinois, Apr. 6-9, 1998, 11 pages.

Foreign Communication From a Related Counterpart Application, Chinese Application No. 200880012955.1, Chinese Office Action dated Jun. 9, 2011, 4 pages.

Foreign Communication From a Related Counterpart Application, Chinese Application No. 200880012955.1, Partial English Translation of Chinese Office Action dated Jun. 9, 2011, 3 pages.

Foreign Communciation From A Related Counterpart Application, Chinese Application No. 200880012955.1, Chinese Office Action dated Apr. 25, 2012, 6 pages.

* cited by examiner

POWER REDUCTION FOR DIGITAL SUBSCRIBER LINE

CROSS-REFERENCE TO RELATED APPLICATIONS

The present application claims priority to U.S. Provisional Patent Application No. 60/991,498 filed Nov. 30, 2007 by Guozhu Long and entitled, "Power Reduction for DSL," and U.S. Provisional Patent Application No. 61/020,993 filed Jan. 14, 2008 by Guozhu Long and entitled, "Power Reduction for DSL," which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital subscriber line (DSL) technologies can provide large bandwidth for digital communications over existing subscriber lines. When transmitting data over the subscriber lines, some DSL technologies, such as Asymmetric DSL (ADSL) or Very high rate DSL (VDSL), use a Discrete Multi-Tone (DMT) line code that allocates a plurality of bits for each sub-carrier or tone in each symbol. The DMT may be adjusted to various channel conditions that may occur at each end of a subscriber line. In such technologies, typically three power management states may be defined, such as in the Telecommunication Standardization Sector (ITU-T) G.992.3/5 and G.993.2 specifications for ADSL2 and VDSL2, respectively. The three power management states comprise a mode 0 (L0) state for normal operation mode, a mode 2 (L2) state for idle mode, and a mode 3 (L3) state for off mode.

Generally, the DSL link is idle most of time. L2 state is designed such that the transceivers can take advantage of that factor to reduce the power consumption by reducing the transmitted signal level. Hence, the DSL transceiver should be maintained more frequently in the L2 state rather than the L0 state at a relatively low-speed connection, which reduces the transmission power spectrum density (PSD) at the corresponding line. Reducing the transmission PSD reduces the power consumption of the line driver, which comprises a relatively large portion of the total power consumption in the system. Additionally, reducing the transmission PSD reduces the crosstalk interference between transmitted signals over adjacent twisted-pair phone lines in a same or nearby bundle of lines. The DSL devices on those lines may sense the decrease in crosstalk interference and adjust their operations accordingly, for instance by increasing their data rate or reducing their transmission PSD. However, when the DSL link is switched from the L2 state to the L0 state to start or resume normal operation mode, the transmission PSD at the corresponding line may suddenly increase. Consequently, the crosstalk interference between signals over the adjacent lines, which have adjusted operations in response to prior decrease in adjacent transmission PSD, may suddenly increase creating non-stationary crosstalk that affects proper reception of signals and degrade stability of DSL operations. Due to this reason, although L2 state is defined in the ADSL2 specifications, the operators are reluctant to use it, and it is not yet defined in VDSL2.

SUMMARY

In one embodiment, the disclosure includes an apparatus comprising a transmitter configured to transmit a low power mode DMT signal using a plurality of DMT tones, wherein a subset of the DMT tones are used for transmitting data, and wherein at least some of the remaining DMT tones are used for a Peak-to-Average Ratio (PAR) reduction.

In another embodiment, the disclosure includes a network component comprising at least one processor configured to implement a method comprising promoting transmission of a plurality of data streams using a plurality of first digital tones, and promoting transmission of at least one second digital tone that reduces a peak of a signal generated by at least one of the first digital tones.

In yet another embodiment, the disclosure includes a method comprising configuring a DSL transmission using a plurality of DMT tones, wherein data is carried on a subset of the DMT tones, detecting one or more peaks in the time-domain signal generated by the subset of DMT tones, configuring at least one remaining DMT tone generating at least one peak-canceling signal based on the detected peak, and transmitting the subset of DMT tones and the configured remaining DMT tones.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein is a method and system to reduce power consumption for a DSL line operations as well as non-stationary crosstalk due to sudden operation state transitions. Specifically, during a low power or idle mode, some of the DSL line sub-carriers or tones may be used, without the remaining tones, for transmitting signals at a same power level of a normal operation mode. The tones used for transmitting the signals may be separated from one another by the remaining tones. As such, the average power for transmissions may be reduced inversely proportional to the number of tones used. To avoid substantial impact in crosstalk interference due to relatively sudden changes in the PSD for the unused tones, the receivers on the adjacent lines monitor only those tones transmitting during L2, thereby eliminating or reducing the impact of non-stationary crosstalk. Further, at least some of the remaining tones may be used for transmitting peak-canceling signals, which may reduce a PAR for transmissions. Reducing the PAR for transmissions in addition to the average power may further reduce the power consumption for the DSL line operations. For example, the line driver may switch to a lower power supply, resulting in lower line driver power consumption.

Figure 1:
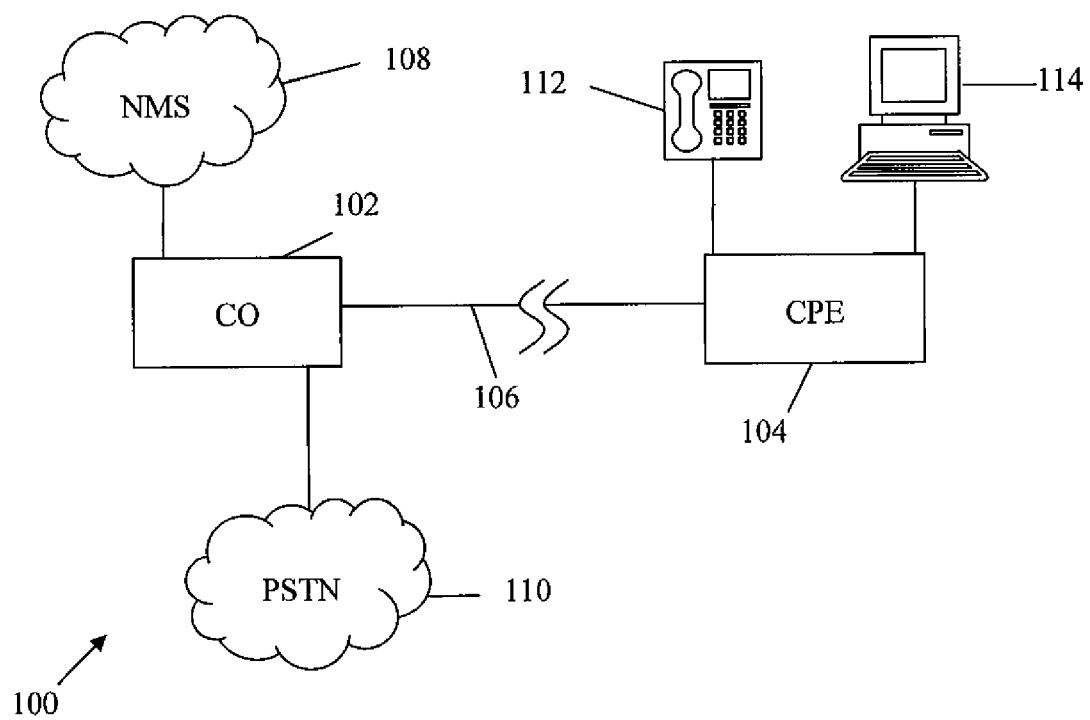
FIG. 1 is a schematic diagram of an embodiment of a DSL system.

FIG. 1 illustrates one embodiment of a DSL system 100. The system 100 may be a VDSL2 system, an ADSL2 system, or any other DSL system. The DSL system 100 may comprise a central office (CO) 102 and a customer premises equipment (CPE) 104, which may be coupled to the CO 102 via a subscriber line 106. Additionally, the DSL system 100 may comprise a network management system (NMS) 108 and a public switched telephone network (PSTN) 110, which may be coupled to the CO 102, and a telephone 112 and a computer 114, which may be coupled to the CPE 104. In other embodiments, the DSL system 100 may be modified to include splitters, filters, management entities, and various other hardware, software, and functionality.

In an embodiment, the CO 102 may comprise a splitter, which may couple the subscriber line 106 and the PSTN 110. Additionally, the CO 102 may comprise a DSL transmitter/receiver (transceiver), which may couple the splitter or the subscriber line 106 to the NMS 108. For instance, the splitter may be a 2:1 coupler that transmits data signals received from the subscriber line 106 to the NMS 108, via the DSL transceiver, and to the PSTN 110, and transmits data signals received from the NMS 108, via the DSL transceiver, and from the PSTN 110 to the subscriber line 106. Further, the splitter may optionally comprise one or more filters to help direct data signals between the NMS 108, the PSTN 110, and the subscriber line 106. The DSL transceiver may comprise a combination transceiver, such as a modem, which transmits signals to and receives signals from the splitter. The DSL transceiver may process the received signals or may simply pass the received signals to the NMS 108. In an embodiment, the DSL transceiver may comprise a forward error correction (FEC) codeword generator that generates FEC data, an interleaver that interleaves the transmitted data across a plurality of DMT tones, or both.

The CPE 104 may also comprise a splitter, which may couple the subscriber line 106 and the telephone 112, and a DSL transceiver, which may couple the splitter or the subscriber line 106 and the computer 114. The splitter may be a 2:1 coupler that transmits data signals received from the subscriber line 106 to the telephone 112 and the DSL transceiver, and transmits data signals received from the telephone 112 and the DSL transceiver to the subscriber line 106. The splitter may optionally comprise one or more filters to help direct data signals to and from the telephone 112 and the DSL transceiver. The DSL transceiver, which may be a modem, may be a transceiver that transmits signals to and receives signals from the splitter. The DSL transceiver may process the received signals to obtain the transmitted data from the CO 102, and pass the received data to the telephone 112, the computer 114, or both, which may access the NMS 108, the PSTN 110, or other coupled networks, via the DSL connection between the CO 102 and the CPE 104.

In an embodiment, the subscriber line 106 may be a telecommunication path between the CO 102 and the CPE 104, and may comprise one or more twisted-pairs of copper cable. The NMS 108 may be a network management infrastructure that processes data exchanged with the CO 102 via the DSL transceiver, and may be coupled to one or more broadband networks, such as the Internet. The PSTN 110 may be a network that generates, processes, and receives voice or other voice-band signals. The telephone 112 may be hardware, software, or both that generates, processes, and receives voice or other voice-band signals.

The signals may be transmitted between the CO 102 and the CPE 104 via the subscriber line 106 using a DMT line code. As such, DSL data may be divided over a plurality of parallel data streams of channels, where each channel may be transmitted using one of a plurality of tones or symbols. Further, each tone in a symbol may be modulated using an appropriate modulation scheme, such as quadrature amplitude modulation (QAM), at a low symbol rate. The sum of data rates for all the modulated tones may be similar or about equal to a single-carrier modulation scheme in the same bandwidth. Channel equalization for the relatively slowly modulated individual tones or symbols may be simpler in comparison to channel equalization of the relatively faster modulated single-carrier. A simpler channel equalization scheme may be beneficial for reducing at least some transmission problems, such as attenuation of high frequencies in a long copper wire, narrowband interference, etc. Additionally, modulating the individual tones or symbols at low symbol rates may facilitate using guard intervals between tones to reduce or eliminate inter-symbol interference (ISI). The individual tones may be received and then combined to obtain the DSL data.

In a low power mode, a small amount of data may be transmitted using some of the tones instead of all the tones to reduce the power consumption of the line driver, and hence the power consumption of the system. As such, the remaining tones may not be used to transmit any data, and the average power for transmissions may be reduced. The small amount of data may be transmitted using every subsequent tone after an equal integer number of unused tones to reduce the transmitted power, thus the total power consumption. Although the crosstalk at the unused tones varies as does the transmitted signal PSD at those tones, all the other lines may monitor the signal quality only at those tones used by L2 while the signal quality of other tones may be obtained through interpolation. Thus, non-stationary crosstalk has no impact to other lines in signal quality measurements. In an embodiment, the data streams may be transmitted as described in contribution BF-054 by Aware to the ITU-T SG15 Q4 meeting in Bordeaux, France, Dec. 3-7, 2007, and entitled "A proposal for a stable Low Power Mode," which is incorporated herein by reference as if reproduced in its entirety. Accordingly, the parallel data streams may be transmitted using every Nth tone from a plurality of tones, where N is a chosen integer. For instance, when N is increased, fewer tones that are further separated apart may be used with more power reduction while the signal quality computation through interpolation may become less accurate. Alternatively, when N is decreased, more tones that are less separated apart may be used with less power reduction, but the signal quality computation through interpolation may become more accurate. Each used tone may be transmitted at about the same power level as a full power mode, hence achieving power savings equal to about $(1-1/N)$ percent. Using such a low power mode scheme, the signal to noise ratio (SNR) for all tones, which may be used to determine the number of bits transmitted, may be measured for the used tones only without the remaining tones. The SNR values for the remaining tones may be obtained using interpolation based on the measured SNR values for the used tones, which include about one Nth (1/N) of the total number of tones.

The power consumption of the system may be farther reduced by reducing the PAR for the transmitted tones during the low power mode. Specifically, in addition to reducing the average power for transmissions by using a subset of the tones to transmit the parallel data streams, the PAR of the transmitted tones may be reduced by decreasing the peak power in the transmitted signal. Otherwise, the line driver may require more power to prevent the peak power for transmitted signals from saturation. For example, reducing the PAR by about six decibels (dB) may reduce the power consumption at the line driver by about half.

In an embodiment, the PAR may be reduced by using the unused tones in the low power mode described above, which do not transmit the data streams. Accordingly, at least some of the unused tones may be used to provide or carry appropriate peak-canceling signals without reducing the total or combined data rate in all the used tones. The peak-canceling signals may span a complete or partial range of the unused tones and mainly comprise peaks that coincide with the peaks in the original signal, but with the opposite sign. The peak-canceling signals may be generated using a plurality of appropriate algorithms, such as a Peak-Reduction Tone (PRT) algorithm described in contribution D.150 by J. Tellado, et al. to the International Telecommunication Union (ITU) WP 1/SG15 meeting in Feb. 9-20, 1998, and entitled "PAR Reduction in Multicarrier Transmission Systems," which is incorporated herein by reference as if reproduced in its entirety. Alternatively or additionally, the peak-canceling signals may be generated using other algorithms, such as PAR reduction algorithms described in contribution CI-017R1 by AMD to the ITU-T SG15 Q4 meeting in Chicago, Apr. 6-9, 1998, and entitled "Complexity of Various PAR Reduction Techniques for G.dmt and G.lite," which is incorporated herein by reference as if reproduced in its entirety. Accordingly, the PAR may be reduced by generating a PAR reducing kernel signal, which may have an impulse response described or represented by a plurality of reserved tones. Those reserved tones are typically dedicated for peak cancellation, thus no data can be transmitted over those tones. This causes some performance loss (achievable data rate reduction). However, in the present system, the tones used for peak cancellation may be unused tones in the low power mode, thus there is no data rate reduction.

Figure 2:
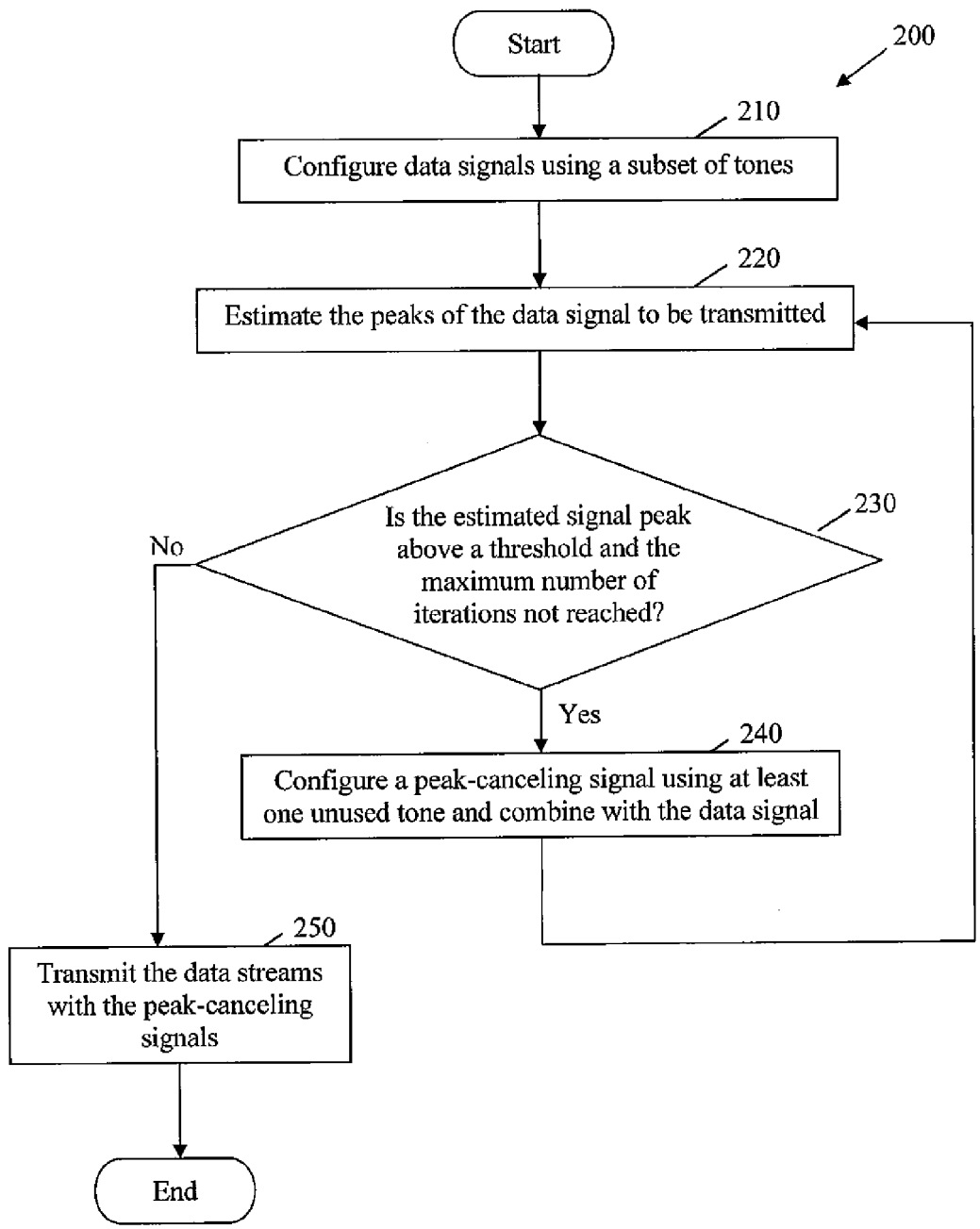
FIG. 2 is a flowchart of a low power transmission method.

FIG. 2 illustrates an embodiment of a low power transmission method 200, which may be used to reduce power consumption for a DSL line operations as well as the impact of non-stationary crosstalk. Specifically, the low power transmission method 200 may use a subset of tones in a DMT line code to transmit the parallel data streams, and hence reduce the average power for transmissions. The remaining tones may be used to transmit the peak-canceling signals, which may be established based on the estimated or detected peak power levels and locations of the transmitted signal. As such, the remaining tones may be transmitted with the used tones to reduce the total or combined PAR. Although the peak-cancelling signal introduces extra power, the additional power is typically very small thus increase the total power by only very little. Reduced PAR may facilitate further reduction of the power consumption, all without reducing the data rate of the transmission.

In an embodiment, the low power transmission method 200 may start at block 210 and configure a plurality of parallel data streams using the subset of tones, which may be separated by an equal number of unused tones. Accordingly, the average power in the data signals may be reduced proportional to the decrease in the quantity of used tones. At block 220, the low power transmission method 200 may estimate the levels and the locations of peaks in the time-domain signal to be transmitted. If some peaks are above a predefined threshold, peak-canceling signals will be configured, e.g. per block 240 below, so that the original peaks are canceled or reduced. Hence, the PSD of each data signal may be obtained. At block 230, the low power transmission method 200 may verify whether there are output signal peaks above a threshold, and the number of maximum iterations is not reached, or both. The peak of the signal may be compared to a saturation level. The number of maximum iterations may be predetermined based on processing power or speed requirements, time delay restrictions, or other factors. In other embodiments, the low power transmission method 200 may verify whether the estimated signal peak is above a threshold or the number of maximum iterations is not reached, but not both. The low power transmission method 200 may proceed to block 240 if the conditions at block 230 are met, e.g. when the estimated power peak is above a threshold, and the number of maximum iterations is not reached. Otherwise, the low power transmission method 200 may transmit the signal with the original data signal and the peak canceling signal at 250 and end.

At block 240, the low power transmission method 200 may configure a peak-canceling signal using at least one unused tone, which may be subsequently combined and transmitted with the original data signal. The otherwise unused tone may be configured as peak-cancelling signals and combined with the subset of used tones. The peak-canceling signal may be established using one or a plurality of unused tones, and may comprise one or a plurality of peaks that coincide with one or a plurality of peaks in the original time-domain signal. The peak-canceling signal may be transmitted with the data signal to reduce the combined or total PAR. However, the peak-canceling signal may not reduce the PAR or all the detected peaks in the PSD for the transmitted data signals by a sufficient amount. For instance, due to limitations in processing capacity or algorithm estimation accuracy, the peak-canceling signal may not substantially or sufficiently reduce all the peaks in the PSD for the transmitted data signals or the total PAR. Hence, the low power transmission method 200 may return to block 220 to repeat the process of estimating the peaks of the signal to be transmitted, and configuring another peak-canceling signal comprising at least one signal peaks, which may be newly generated peaks in the previous peak-cancelling process or previously existing peaks. This process may be repeated until no more peaks can be found, or the maximum number of iterations is reached. As such, the combined PAR or the number of peaks in the signal may be reduced after every iteration.

In an embodiment, all the peaks in the data signals may be reduced with relatively high or acceptable probability when the threshold and the upper maximum number of iterations are set appropriately. However, there may be a tradeoff between the amount of PAR reduction achieved and the complexity for processing the transmitted data signals and generating the peak-canceling signal. For instance, increasing the number of unused tones to generate the peak-canceling signal, increasing the maximum number of iterations, or both may further reduce the PAR in the transmitted signals but increase the computation complexity or cost. Increasing the number of unused tones to generate the peak-canceling signal may also increase the average power for transmission. However, such increase in average power is usually small or insignificant with respect to the achieved reduction in PAR and in an overall or total power consumption of the line driver.

Figure 3:
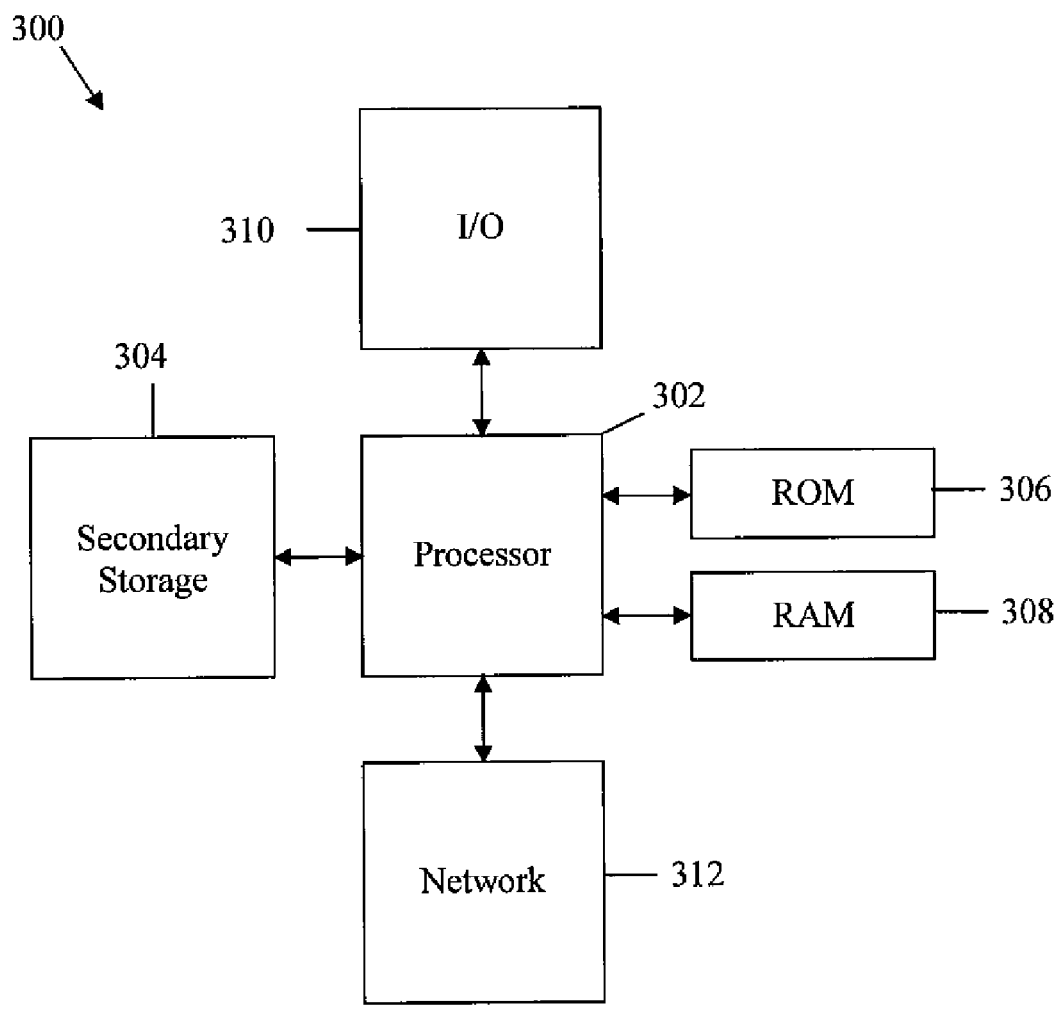
FIG. 3 is a schematic diagram of one embodiment of a general-purpose computer system.

The network components described above may be implemented on any general-purpose network component, such as a computer or network component with sufficient processing power, memory resources, and network throughput capability to handle the necessary workload placed upon it. FIG. 3 illustrates a typical, general-purpose network component 300 suitable for implementing one or more embodiments of the components disclosed herein. The network component 300 includes a processor 302 (which may be referred to as a central processor unit or CPU) that is in communication with memory devices including secondary storage 304, read only memory (TOM) 306, random access memory (RAM) 308, input/output (I/O) devices 310, and network connectivity devices 312. The processor 302 may be implemented as one or more CPU chips, or may be part of one or more application specific integrated circuits (ASICs).

The secondary storage 304 is typically comprised of one or more disk drives or erasable programmable ROM (EPROM) and is used for non-volatile storage of data. Secondary storage 304 may be used to store programs that are loaded into RAM 308 when such programs are selected for execution. The ROM 306 is used to store instructions and perhaps data that are read during program execution. ROM 306 is a non-volatile memory device that typically has a small memory capacity relative to the larger memory capacity of secondary storage 304. The RAM 308 is used to store volatile data and perhaps to store instructions. Access to both ROM 306 and RAM 308 is typically faster than to secondary storage 304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a transmitter configured to transmit a low power mode Discrete Multi-Tone (DMT) signal using a plurality of DMT tones,
wherein a subset of the DMT tones are used for transmitting data, and
wherein at least some of the remaining DMT tones that are not used for transmitting data are used for a Peak-to-Average Ratio (PAR) reduction,
wherein a signal to noise ratio (SNR) for the subset of DMT tones is measured by a receiver, and wherein the SNRs for the remaining DMT tones are obtained by interpolation using the measured SNR for the subset of DMT tones.

2. The apparatus of claim 1, wherein the subset of DMT tones comprises every Nth DMT tone, and wherein N is an integer greater than 1.

3. The apparatus of claim 1, wherein the PAR reduction comprises generating a peak-canceling signal that substantially cancels or reduces a peak in the signal.

4. The apparatus of claim 3, wherein the peak-canceling signal is generated using a
Peak-Reduction Tone (PRT) algorithm.

5. The apparatus of claim 1, wherein the low power mode DMT transmission reduces an average transmission power and a peak-to-average power ratio, thereby reducing a power consumption at a line driver.

6. An apparatus comprising:
a transmitter configured to transmit a low power mode Discrete Multi-Tone (DMT) signal using a plurality of DMT tones,
wherein a subset of the DMT tones are used for transmitting data, and wherein at least some of the remaining DMT tones that are not used for transmitting data are used for a Peak-to-Average Ratio (PAR) reduction,
wherein the subset of DMT tones comprises every Nth DMT tone, and wherein N is an integer greater than 1,
wherein the subset of DMT tones are transmitted at about the same power level as a normal power mode DMT signal, and wherein a power savings of about (1-1/N) percent is achieved in the low power mode DMT signal.

7. A network component comprising:
a transmitter configured to:
transmit a plurality of data streams using a plurality of first digital tones from a plurality of tones; and
transmit a plurality of second digital tones from the plurality of tones that reduce a peak of a signal generated by at least one of the first digital tones,
wherein the quantity of the first digital tones is less than the quantity of the second digital tones,
wherein the plurality of first digital tones comprises every Nth tone of the plurality of tones, and wherein N is an integer greater than 1.

8. The network component of claim 7, wherein each data stream is transmitted at a lower symbol rate than if the data streams were transmitted using a single-carrier.

9. The network component of claim 7, wherein the second digital tones generate at least one peak that coincides with the peak of the signal generated by the at least one of the first digital tones.

10. The network component of claim 9, wherein the signal peak associated with the first digital tones is greater than or equal to a threshold.

11. The network component of claim 9, wherein the second digital tones are configured a plurality of times before being transmitted.

12. The network component of claim 9, wherein the second digital tones cancel or reduce a plurality of signal peaks associated with the first digital tones.

13. The network component of claim 7, wherein the second digital tones do not reduce the data rate associated with the first digital tones as compared with transmitting the first digital tones without the second digital tones.

14. The network component of claim 7, wherein the second digital tones slightly increase the average power for transmission, but decrease the Peak-to-Average Ratio (PAR) and the total power consumption for transmission as compared with transmitting the first digital tones without the second digital tones.

15. A method comprising:
configuring a digital subscriber line (DSL) transmission using a plurality of Discrete Multi-Tone (DMT) tones, wherein data is carried on a subset of the DMT tones;
detecting one or more peaks in a time-domain signal generated by the subset of DMT tones;
configuring at least one remaining DMT tone to generate at least one peak-canceling signal based on the detected one or more peaks; and
transmitting the subset of DMT tones and the configured at least one remaining DMT tone.

16. The method of claim 15, wherein the DSL transmission is an Asymmetric DSL
(ADSL) transmission or a Very high rate DSL (VDSL) transmission.

17. An apparatus comprising:
a transmitter configured to transmit a low power mode Discrete Multi-Tone (DMT) signal using a plurality of DMT tones,
wherein a subset of the DMT tones are used for transmitting data,
wherein at least some of the remaining DMT tones are used for a Peak-to-Average Ratio (PAR) reduction, and
wherein the subset of DMT tones are transmitted at about the same power level as a normal power mode DMT signal,
wherein the subset of DMT tones comprises every Nth DMT tone, wherein N is an integer greater than 1, and wherein a power savings of about (1-1/N) percent is achieved in the low power mode DMT signal.

18. An apparatus comprising:
a transmitter configured to transmit a low power mode Discrete Multi-Tone (DMT) signal using a plurality of DMT tones,
wherein a subset of the DMT tones are used for transmitting data,
wherein at least some of the remaining DMT tones are used for a Peak-to-Average Ratio (PAR) reduction,
wherein a signal to noise ratio (SNR) for the subset of DMT tones is measured by a receiver, and
wherein the SNRs for the remaining DMT tones are obtained by interpolation using the measured SNR for the subset of DMT tones.

19. A network component comprising:
a transmitter configured to:
transmit a plurality of data streams using a plurality of first digital tones; and
transmit at least one second digital tone that reduces a peak of a signal generated by at least one of the first digital tones,
wherein the at least one second digital tone slightly increases the average power for transmission, but decreases the Peak-to-Average Ratio (PAR) and the total power consumption for transmission as compared with transmitting the first digital tones without the second digital tones.

* * * * *